(12) United States Patent
Lu et al.

(10) Patent No.: US 12,008,935 B2
(45) Date of Patent: Jun. 11, 2024

(54) ARCUATE DISPLAY DEVICE

(71) Applicant: AUO Corporation, Hsinchu (TW)

(72) Inventors: Kai-Yi Lu, Hsinchu (TW); Hung-Chi Wang, Hsinchu (TW); Chen-Yu Lin, Hsinchu (TW); Ya-Fang Chen, Hsinchu (TW); Chih-Hsiang Yang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/176,487

(22) Filed: Mar. 1, 2023

(65) Prior Publication Data
US 2023/0282144 A1    Sep. 7, 2023

(30) Foreign Application Priority Data

Mar. 4, 2022 (TW) ................................. 111107880

(51) Int. Cl.
*G09G 3/00* (2006.01)

(52) U.S. Cl.
CPC ....... *G09G 3/03* (2020.08); *G09G 2320/0233* (2013.01); *G09G 2360/00* (2013.01)

(58) Field of Classification Search
CPC ............. G09G 3/03; G09G 2320/0233; G09G 2360/00
See application file for complete search history.

(56) References Cited

U.S. PATENT DOCUMENTS 10,670,893 B2    6/2020  Lu et al.
2019/0163006 A1*  5/2019  Lu ..................... G02F 1/134336

FOREIGN PATENT DOCUMENTS

CN        107908038       4/2018
CN        113035082       6/2021

* cited by examiner

*Primary Examiner* — Adam R. Giesy
(74) *Attorney, Agent, or Firm* — JCIPRNET (57) ABSTRACT

An arcuate display device includes a plurality of display units each having has a plurality of pixels, a virtual axis, and a plurality of driving devices. Each pixel includes first, second, and third light-emitting elements respectively disposed at first, second, and third positions. The driving devices corresponding to the display units having the same minimum distance from the virtual axis have the same circuit layout design. The first, second, and third positions are sequentially arranged in a direction away from the virtual axis. Optical properties of the first light-emitting elements and the third light-emitting elements in at least a part of the pixels disposed at a first side of the virtual axis are respectively substantially the same as optical properties of the third light-emitting elements and the first light-emitting elements in at least a part of the pixels disposed at a second side of the virtual axis.

11 Claims, 8 Drawing Sheets

ARCUATE DISPLAY DEVICE

CROSS-REFERENCE TO RELATED APPLICATION

This application claims the priority benefit of Taiwanese application no. 111107880, filed on Mar. 4, 2022. The entirety of the above-mentioned patent application is hereby incorporated by reference herein and made a part of this specification.

BACKGROUND

Technical Field

The disclosure relates to a display device. Particularly, the disclosure relates to an arcuate display device.

Description of Related Art

Figure 1A:
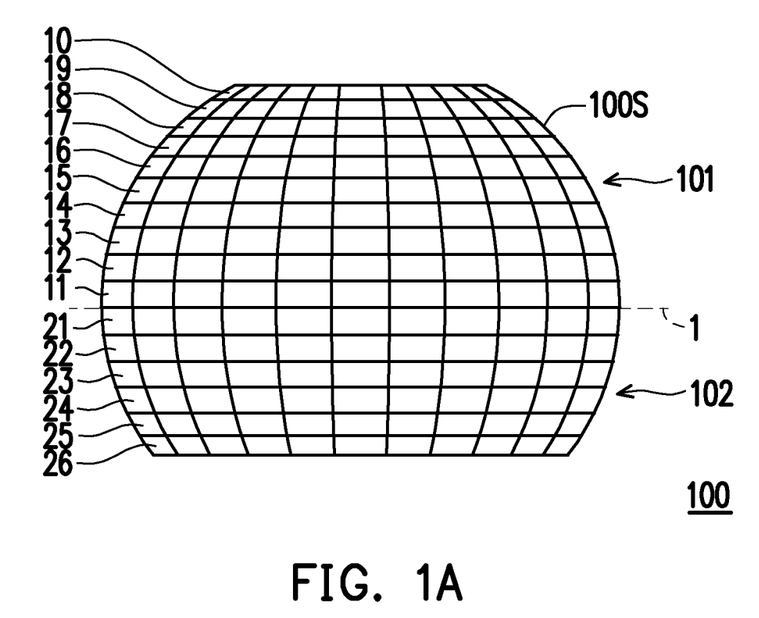
FIG. 1A is a schematic view of an arcuate display device according to an embodiment of the disclosure.
Figure 1B:
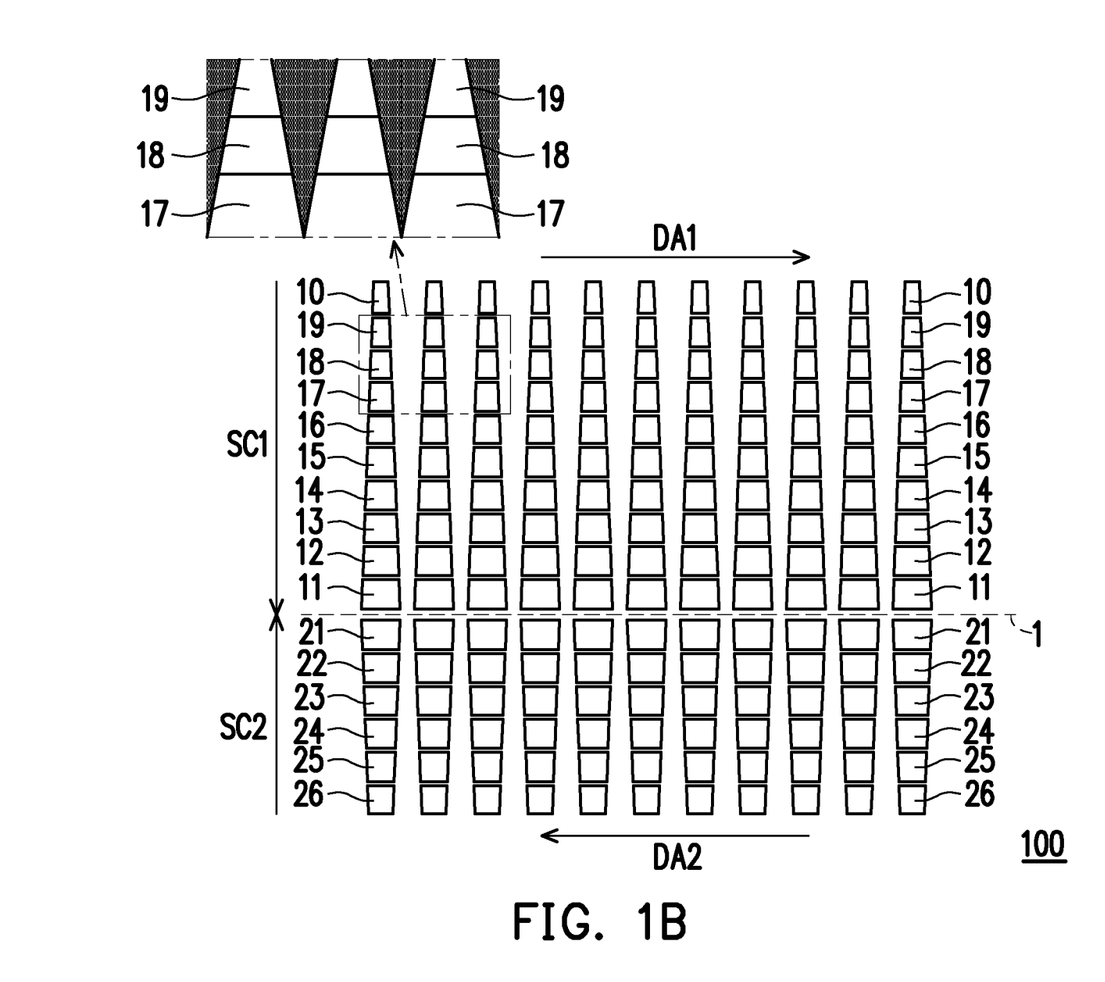
FIG. 1B is a schematic planar exploded view of the arcuate display device shown in FIG. 1A.
Figure 1C:
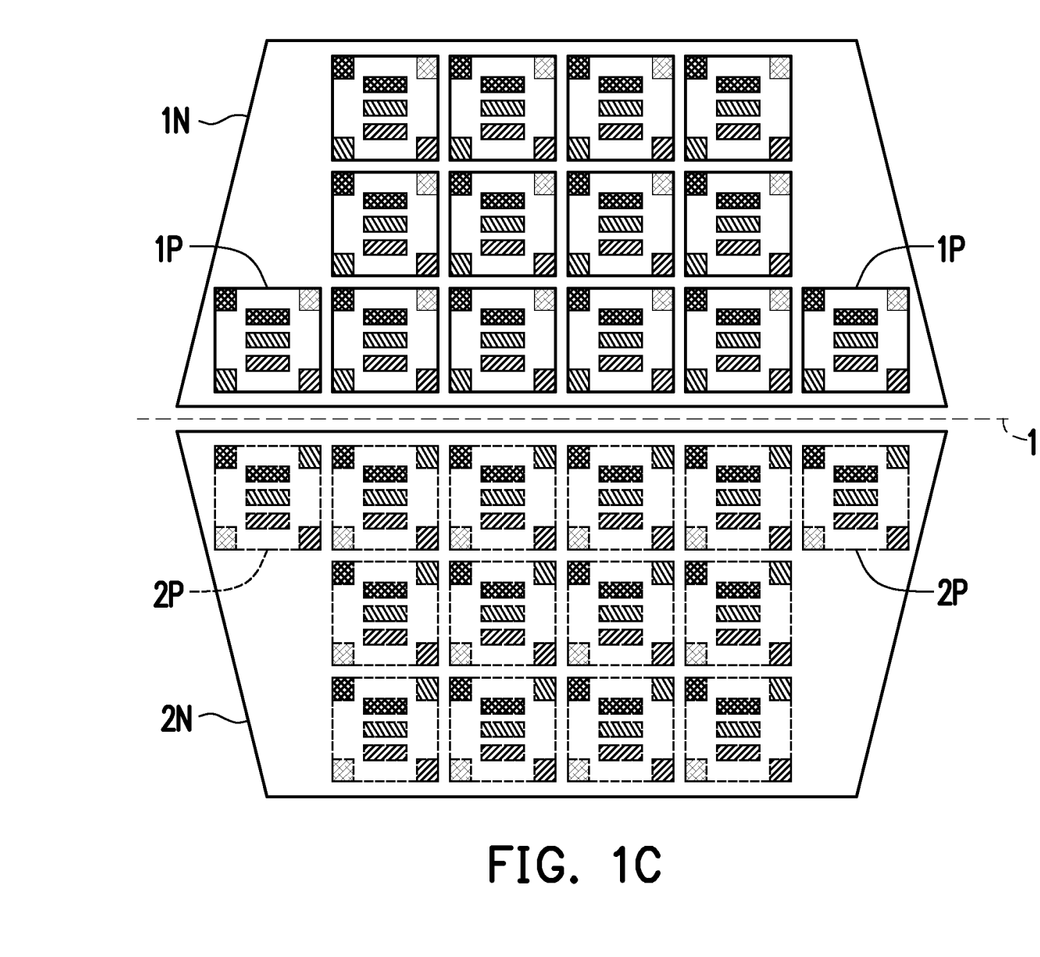
FIG. 1C is a schematic view of display units according to an embodiment of the disclosure.

With the development of the technology industry, displays have been widely used in daily life. Among them, an arcuate display device provides an experience different from a flat-panel display, and is often used in large-scale exhibitions. Referring to FIG. 1A, FIG. 1B, and FIG. 1C showing an arcuate display device, FIG. 1A is a schematic perspective view of an arcuate display device, FIG. 1B is a schematic planar exploded view of an arcuate display device, and FIG. 1C is a schematic view of display units.

An arcuate display device 100 includes a virtual axis 1 and a plurality of display units 11, 12, 13, 14, 15, 16, 17, 18, 19, 10, 21, 22, 23, 24, 25, and 26. The plurality of display units 11, 12, 13, 14, 15, 16, 17, 18, 19, and 10 and the plurality of display units 21, 22, 23, 24, 25, and 26 are respectively disposed at a first side 101 and a second side 102 of the virtual axis 1. The plurality of display units 11 corresponds to the plurality of display units 21, the plurality of display units 12 corresponds to the plurality of display units 22, the plurality of display units 13 corresponds to the plurality of display units 23, and so on. The corresponding display units have the same size, and thus have the same number of pixels therein. Moreover, the number of pixels that the display unit has increases as a distance from the display unit to the virtual axis 1 decreases. Specifically, as shown in FIG. 1C, the number of pixels 1P that the display unit 1N located at the first side 101 has is the same as the number of pixels 2P that the display unit 2N located at the second side 102 has, where N=1, 2, 3, 4, 5, and 6. The number of pixels 1P that each display unit 11 has is greater than the number of pixels 1P that each display unit 12 has. The number of pixels 2P that each display unit 21 has is greater than the number of pixels 2P that each display unit 22 has.

In a conventional comparative example, the display units disposed at the first side 101 and the second side 102 of the virtual axis 1 are controlled by different driving circuits. The pictures at the first side 101 and the second side 102 may exhibit uneven brightness and chromaticity due to the difference in the driving circuits.

In addition, arrangement of sub-pixels of each of the pixels 1P and 2P may also cause bright or dark lines to appear in some color pictures. In another conventional comparative example, taking the schematic views shown in FIG. 1B and FIG. 1C as an example, if the pixel 1P in the display unit 11 is sequentially arranged with a blue sub-pixel, a green sub-pixel, and a red sub-pixel along the direction away from the virtual axis 1, and the display unit 21 is arranged by transposing the display unit 11 by 180 degrees, then the pixel 2P in the display unit 21 is sequentially arranged with a blue sub-pixel, a green sub-pixel, and a red sub-pixel along the direction away from the virtual axis 1. In such a case, when the arcuate display device 100 displays a red picture, since the red sub-pixel in the pixel 1P closest to the virtual axis 1 and the red sub-pixel in the pixel 2P closest to the virtual axis 1 are farther from the virtual axis 1 than the blue sub-pixel and the green sub-pixel are, a dark line may appear at a place close to the virtual axis 1 on the picture. Comparatively, when the arcuate display device 100 displays a blue picture, since the blue sub-pixel in the pixel 1P closest to the virtual axis 1 and the blue sub-pixel in the pixel 2P closest to the virtual axis 1 are closer to the virtual axis 1 than the red sub-pixel and the green sub-pixel are, a blue bright line may appear at a place close to the virtual axis 1 on the picture.

In yet another conventional comparative example, the pixel 1P located in the display unit 1N at the first side 101 is sequentially arranged with a blue sub-pixel, a green sub-pixel, and a red sub-pixel from left to right along the direction parallel to the virtual axis 1, and the display unit 2N located at the second side 102 is arranged by transposing the display unit 1N by 180 degrees, then the pixel 2P in the display unit 2N is sequentially arranged with a blue sub-pixel, a green sub-pixel, and a red sub-pixel from right to left along the direction of the virtual axis 1. In such a case, when the arcuate display device 100 displays a red picture, the red sub-pixel of the pixel 1P in the display unit 1N and the red sub-pixel of the pixel 2P in the display unit 2N may be misaligned with each other along the direction of the virtual axis 1. Moreover, when the arcuate display device 100 displays a blue picture, misalignment similar to the red picture may also exist.

SUMMARY

The disclosure provides an arcuate display device, in which pictures at two sides of a virtual axis (symmetry axis) do not exhibit uneven brightness and chromaticity due to the difference in driving circuits, dark or bright lines do not appear at a place close to the virtual axis, and sub-pixels at two sides of the virtual axis are be misaligned.

According to an embodiment of the disclosure, an arcuate display device includes a plurality of display units, a virtual axis, and a plurality of driving devices. The display units are arranged into an array form on an arcuate display surface of the arcuate display device. Each of the display units has a plurality of pixels. Each of the pixels includes a substrate and a first light-emitting element, a second light-emitting element, and a third light-emitting element. The first light-emitting element is disposed at a first position of the substrate, the second light-emitting element disposed at a second position of the substrate, and the third light-emitting element disposed at a third position of the substrate. The virtual axis is located on the arcuate display surface. The display units are respectively disposed at a first side and a second side of the virtual axis. The number of pixels that the display unit has increases as a distance from the display unit to the virtual axis decreases. The driving devices are configured to respectively control the display units. The driving devices corresponding to the display units having a same minimum distance from the virtual axis have a same circuit layout design. The first position, the second position, and the third position are sequentially arranged in a direction away from the virtual axis. Optical properties of the first light-emitting elements and the third light-emitting elements in at least a part of the pixels disposed at the first side of the virtual axis are respectively substantially the same as optical properties of the third light-emitting elements and the first light-emitting elements in at least a part of the pixels disposed at the second side of the virtual axis.

Based on the foregoing, in the arcuate display device provided by the embodiment of the disclosure, the driving devices corresponding to the display units having the same minimum distance from the virtual axis have the same circuit layout design, preventing influences of the difference in the parasitic resistance and parasitic capacitance caused by the difference in circuit layout in different driving devices on the optical performance. In addition, the light-emitting elements of different colors in the pixels disposed at different sides of the virtual axis may be arranged in the same direction, so that dark or bright lines do not appear at a place close to the virtual axis, and the corresponding light-emitting elements of the same color at two sides of the virtual axis are not be misaligned.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Referring to FIG. 1A to FIG. 1C, the arcuate display device 100 includes a plurality of display units 11, 12, 13, 14, 15, 16, 17, 18, 19, 10, 21, 22, 23, 24, 25, and 26, a virtual axis 1, and a plurality of driving devices. The plurality of display units are arranged into an array form on an arcuate display surface 100S of the arcuate display device 100. The virtual axis 1 is located on the arcuate display surface 100S. The display units 11, 12, 13, 14, 15, 16, 17, 18, 19, 10, 21, 22, 23, 24, 25, and 26 are respectively disposed at the first side 101 and the second side 102 of the virtual axis 1. Specifically, the plurality of display units 11 are disposed at positions having the same minimum distance from the virtual axis 1. The plurality of display units 12 are disposed at positions having the same minimum distance from the virtual axis 1. The minimum distance between each display unit 12 and the virtual axis 1 is greater than the minimum distance between each display unit 11 and the virtual axis 1, and so on. Similarly, the plurality of display units 21 are disposed at positions having the same minimum distance from the virtual axis 1. The plurality of display units 22 are disposed at positions having the same minimum distance from the virtual axis 1. The minimum distance between each display unit 22 and the virtual axis 1 is greater than the minimum distance between each display unit 21 and the virtual axis 1, and so on.

Each of the plurality of display units 11, 12, 13, 14, 15, 16, 17, 18, 19, 10, 21, 22, 23, 24, 25, and 26 has a plurality of pixels. As shown in FIG. 1C, the display unit 1N disposed at the first side 101 of the virtual axis 1 includes a plurality of pixels 1P, where N=0 to 9. Nonetheless, the disclosure is not limited thereto, and N may also be a positive integer greater than 9. The display unit 2N disposed at the second side 102 of the virtual axis 1 includes a plurality of pixels 2P, where N=1 to 6. Nonetheless, the disclosure is not limited thereto, and N may also be a positive integer greater than 6. Moreover, the number of pixels that the display unit has increases as the distance from the display unit to the virtual axis 1 decreases. For example, each display unit 11 has more pixels 1P than each display unit 12 does, each display unit 12 has more pixels 1P than each display unit 13 does, and so on. Similarly, each display unit 21 has more pixels 2P than each display unit 22 does, each display unit 22 has more pixels 2P than each display unit 23 does, and so on.

In addition, since each display unit 11 and each display unit 21 have the same the minimum distance from the virtual axis 1, the number of pixels 1P that each display unit 11 has is the same as the number of pixels 2P that each display unit 21 has. Similarly, the number of pixels 1P that each display unit 12 has is the same as the number of pixels 2P that each display unit 22 has, and so on. Nonetheless, the disclosure is not limited thereto. In other embodiments, different display units having the same minimum distance from the virtual axis 1 may have different numbers of pixels.

In the embodiment shown in FIG. 1A to FIG. 1C, the plurality of driving devices are respectively configured to control the display units 11, 12, 13, 14, 15, 16, 17, 18, 19, 10, 21, 22, 23, 24, 25, and 26. Moreover, the driving devices corresponding to the display units having the same minimum distance from the virtual axis 1 have the same circuit layout design. Specifically, the driving device corresponding to the display unit 11 and the driving device corresponding to the display unit 21 have the same circuit layout design, the driving device corresponding to the display unit 12 and the driving device corresponding to the display unit 22 have the same circuit layout design, and so on.

Referring to FIG. 1A and FIG. 1B, the display units 11, 12, 13, 14, 15, 16, 17, 18, 19, and 10 disposed at the first side 101 of the virtual axis 1 are configured to receive a first scan signal SC1 and a first data signal DA1. The display units 21, 22, 23, 24, 25, and 26 disposed at the second side 102 of the virtual axis 1 are configured to receive a second scan signal SC2 and a second data signal DA2. A transmission direction of the first scan signal SC1 is opposite to a transmission direction of the second scan signal SC2, and a transmission direction of the first data signal DA1 is opposite to a transmission direction of the second data signal DA2.

It should be noted that the image processing flow of the arcuate display includes the following. Arcuate compression processing is performed on standard images by software or hardware devices. Then, an arcuate image is expanded and interpolated with a region of zero grayscale (without a picture) through algorithms (i.e., the arcuate image is restored to the standard aspect ratio). This rectangular image is cut by IP-BOX, and then the system is controlled by the back-end players Tx/Rx to light up the LED display. Referring to FIG. 1B, as shown in the enlarged view at the upper side, the first data signal DA1 corresponding to a display unit disposed at the first side 101 and farther from the virtual axis 1 (e.g., the display unit 19) has more signals corresponding to zero grayscale than a display unit closer to the virtual axis 1 (e.g., the display unit 17) does. Similarly, the second data signal DA2 corresponding to a display unit disposed at the second side 102 and farther from the virtual axis 1 includes more signals corresponding to zero grayscale.

Figure 2:
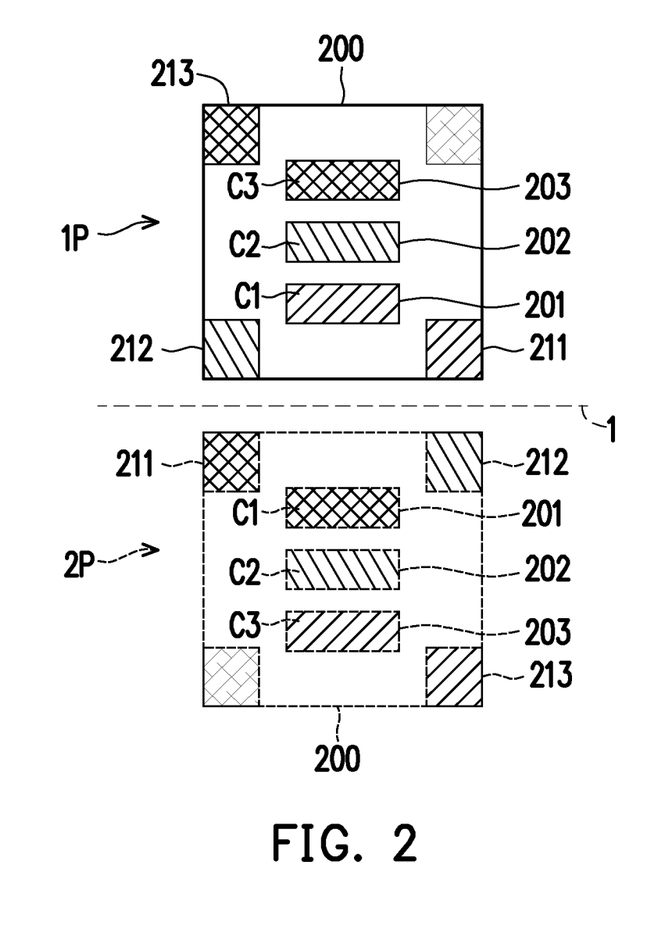
FIG. 2 is a schematic view of pixel configuration according to an embodiment of the disclosure.

Referring to FIG. 2, FIG. 2 is a schematic view of pixel configuration according to an embodiment of the disclosure. Each pixel 1P disposed at the first side 101 of the virtual axis 1 and each pixel 2P disposed at the second side 102 of the virtual axis 1 include a substrate 200 and a first position 201, a second position 202, and a third position 203 disposed on the substrate 200 and arranged in a direction away from the virtual axis 1. A first light-emitting element C1, a second light-emitting element C2, and a third light-emitting element C3 are respectively disposed at the first position 201, the second position 202, and the third position 203. A first conductive pin 211, a second conductive pin 212, and a third conductive pin 213 respectively corresponding to the first position 201, the second position 202, and the third position 203 are also disposed on the substrate 200. In other words, circuit configuration of the substrate of each pixel 1P disposed at the first side 101 of the virtual axis 1 is the same as circuit configuration of the substrate of each pixel 2P disposed at the second side 102 of the virtual axis 1. As a result, the driving devices corresponding to the display units having the same minimum distance from the virtual axis 1 may have the same circuit layout design. In terms of production/manufacturing, the complexity during material preparation and differences during production/manufacturing can be reduced, making the properties of different display units relatively similar. Moreover, the product development time and cost can be reduced, preventing relatively great amount of work in re-planning of the controller end possibly caused by different designs of driving devices, and relatively complicated program and setting management. In addition, the driving devices have the same design, thus preventing influences of the difference in the parasitic resistance and parasitic capacitance in different driving devices on optics.

In the following embodiments, various correspondences between the first to third light-emitting elements C1 to C3 at the first side 101 and the first to third light-emitting elements C1 to C3 at the second side 102 will be exemplified. For convenience of understanding, the first to third conductive pins 211 to 213 are shown with the same screentones as those of the first to third light-emitting elements C1 to C3 at the corresponding first to third positions 201 to 203.

Next, referring to FIG. 3 to FIG. 6, FIG. 3 to FIG. 6 are schematic views of display units according to embodiments of the disclosure. It should be noted that, in the embodiments shown in FIG. 3 to FIG. 6, the pixels 1P in each of the display units 11, 12, 13, 14, 15, 16, 17, 18, 19, and 10 have the same configuration. Here, the configuration of the pixels 1P does not include the number of pixels 1P, and refers to configuration of the first to third light-emitting elements C1 to C3 in the pixel 1P. Similarly, the pixels 2P in each of the display units 21, 22, 23, 24, 25, and 26 have the same configuration. Since the pixels 1P in each of the display units 11, 12, 13, 14, 15, 16, 17, 18, 19, and 10 have the same configuration, and the pixels 2P in each of the display units 21, 22, 23, 24, 25, and 26 have the same configuration, FIG. 3 to FIG. 6 illustrate schematic configuration views of display units of the arcuate display device of some embodiments of the disclosure taking the display unit 11 disposed at the first side 101 and the display unit 21 disposed at the second side 102 as representatives, and the configuration of the other display units 12, 13, 14, 15, 16, 17, 18, 19, 10 and display units 22, 23, 24, 25, and 26 will not be repeatedly described.

Figure 3:
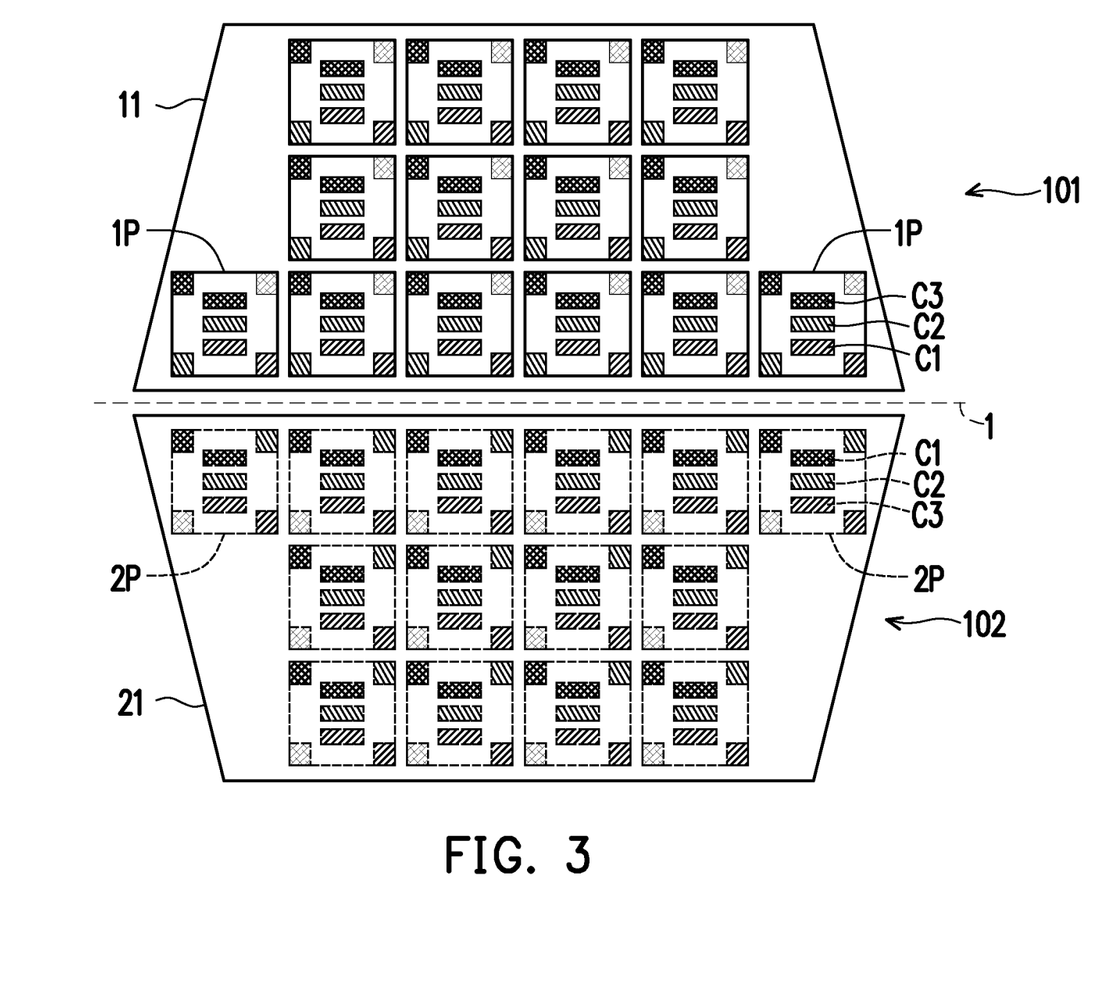
FIG. 3 to FIG. 6 are schematic views of display units according to embodiments of the disclosure.

Referring to FIG. 3, in this embodiment, optical properties of the first light-emitting element C1 and the third light-emitting element C3 in each pixel 1P disposed at the first side 101 of the virtual axis 1 are respectively substantially the same as optical properties of the third light-emitting element C3 and the first light-emitting element C1 in each pixel 2P disposed at the second side 102 of the virtual axis 1. Moreover, optical properties of the second light-emitting element C2 in each pixel 1P are substantially the same as optical properties of the second light-emitting element C2 in each pixel 2P.

In an embodiment of the disclosure, the first light-emitting element C1 in each pixel 1P and the third light-emitting element C3 in each pixel 2P emit red light, the second light-emitting element C2 in each pixel 1P and the second light-emitting element C2 in each pixel 2P emit green light, and the third light-emitting element C3 in each pixel 1P and the first light-emitting element C1 in each pixel 2P emit blue light, but the disclosure is not limited thereto. In this embodiment, when the picture displays red, green, or blue, two red lines, two green lines, or two blue lines that are relatively close to each other do not appear at a place close to the virtual axis 1 compared with other positions on the arcuate display device, and a red line at the first side 101 and a red line at the second side 102 are also not misaligned with each other (green lines in a green picture or blue lines in a blue picture are not misaligned with each other similarly). Similarly, when the picture displays red, green, or blue, dark lines do not appear at a place close to the virtual axis 1.

In the embodiment shown in FIG. 3, among the plurality of pixels 1P disposed at the first side 101 of the virtual axis 1, optical properties (i.e., emitting light of the same color) of the first light-emitting elements C1 of each adjacent two of the pixels 1P correspond to each other, optical properties of the second light-emitting elements C2 of each adjacent two of the pixels 1P correspond to each other, and optical properties of the third light-emitting elements C3 of each adjacent two of the pixels 1P correspond to each other. Each adjacent two of the plurality of pixels 2P disposed at the second side 102 of the virtual axis 1 also have the same correspondence, as shown in FIG. 3, which will not be repeatedly described here.

To fully describe various implementing aspects of the disclosure, other embodiments of the disclosure will be described below. It should be noted here that the reference numerals and part of the content of the embodiments above remain to be used in the following embodiments, where the same reference numerals are used to denote the same or similar elements, and the description of the same technical content is omitted. Reference may be made to the embodiments above for the description of the omitted part, which will not be repeated in the following embodiments.

Figure 4:
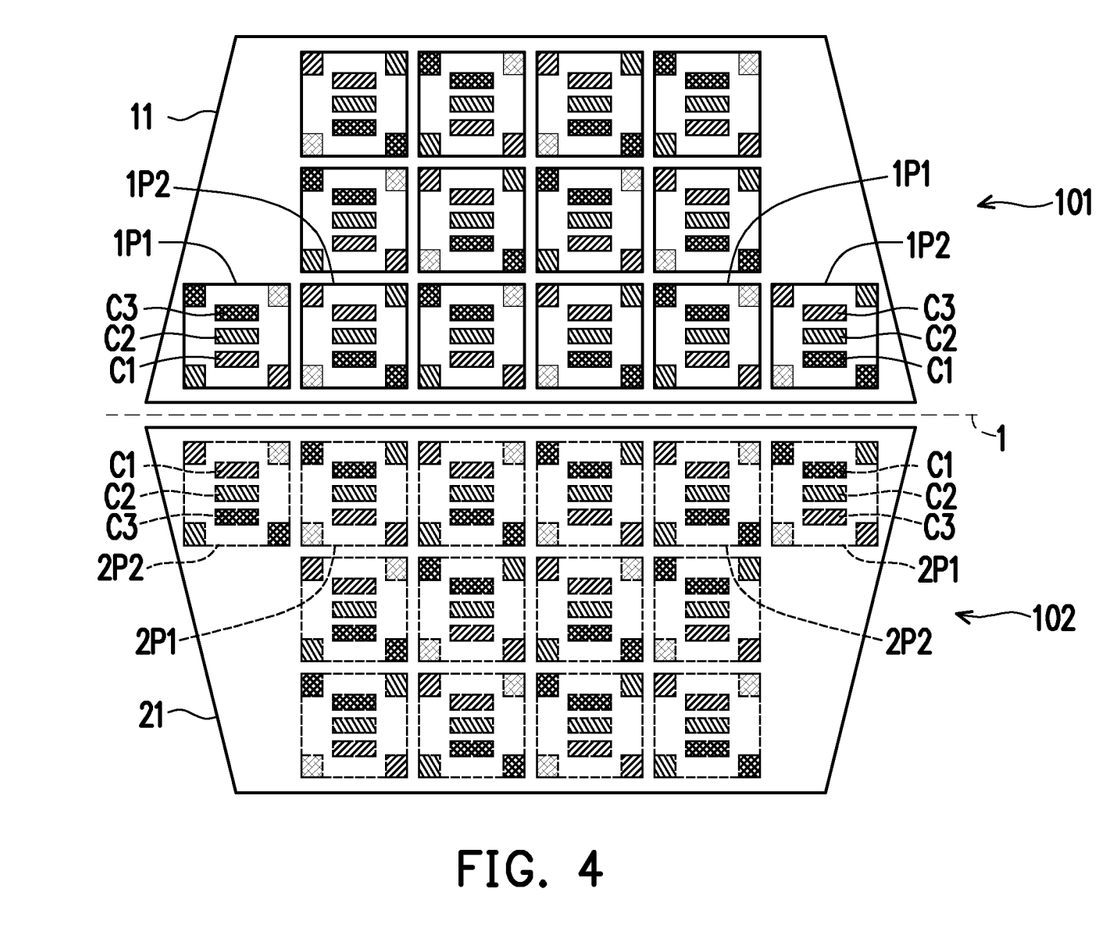

Referring to FIG. 4, in this embodiment, optical properties of the first light-emitting element C1 and the third light-emitting element C3 in each pixel 1P1 disposed at the first side 101 of the virtual axis 1 are respectively substantially the same as optical properties of the third light-emitting element C3 and the first light-emitting element C1 in each pixel 2P1 disposed at the second side 102 of the virtual axis 1. Moreover, optical properties of the second light-emitting element C2 in each pixel 1P1 are substantially the same as optical properties of the second light-emitting element C2 in each pixel 2P1. Optical properties of the first light-emitting element C1 and the third light-emitting element C3 in each pixel 1P2 disposed at the first side 101 of the virtual axis 1 are respectively substantially the same as optical properties of the third light-emitting element C3 and the first light-emitting element C1 in each pixel 2P2 disposed at the second side 102 of the virtual axis 1. Moreover, optical properties of the second light-emitting element C2 in each pixel 1P2 are substantially the same as optical properties of the second light-emitting element C2 in each pixel 2P2.

In an embodiment of the disclosure, the first light-emitting element C1 in each pixel 1P1, the third light-emitting element C3 in each pixel 1P2, the third light-emitting element C3 in each pixel 2P1, and the first light-emitting element C1 in each pixel 2P2 emit red light. The third light-emitting element C3 in each pixel 1P1, the first light-emitting element C1 in each pixel 1P2, the first light-emitting element C1 in each pixel 2P1, and the third light-emitting element C3 in each pixel 2P2 emit blue light. The second light-emitting element C2 in each pixel 1P1, the second light-emitting element C2 in each pixel 1P2, the second light-emitting element C2 in each pixel 2P1, and the second light-emitting element C2 in each pixel 2P2 emit green light. Nonetheless, the disclosure is not limited thereto. In this embodiment, when the picture displays red, green, or blue, two red lines, two green lines, or two blue lines that are relatively close to each other do not appear at a place close to the virtual axis 1 compared with other positions on the arcuate display device, and a red line at the first side 101 and a red line at the second side 102 are also not misaligned with each other (green lines in a green picture or blue lines in a blue picture are not misaligned with each other similarly). Similarly, when the picture displays red, green, or blue, dark lines do not appear at a place close to the virtual axis 1.

In the embodiment shown in FIG. 4, among the plurality of pixels 1P disposed at the first side 101 of the virtual axis 1, optical properties (i.e., emitting light of the same color) of the first light-emitting element C1 of one of each adjacent two of the pixels 1P correspond to optical properties of the third light-emitting element C3 of the other pixel 1P, and optical properties of the second light-emitting elements C2 of each adjacent two of the pixels 1P correspond to each other. Each adjacent two of the plurality of pixels 2P disposed at the second side 102 of the virtual axis 1 also have the same correspondence, as shown in FIG. 4, which will not be repeatedly described here.

Figure 5:
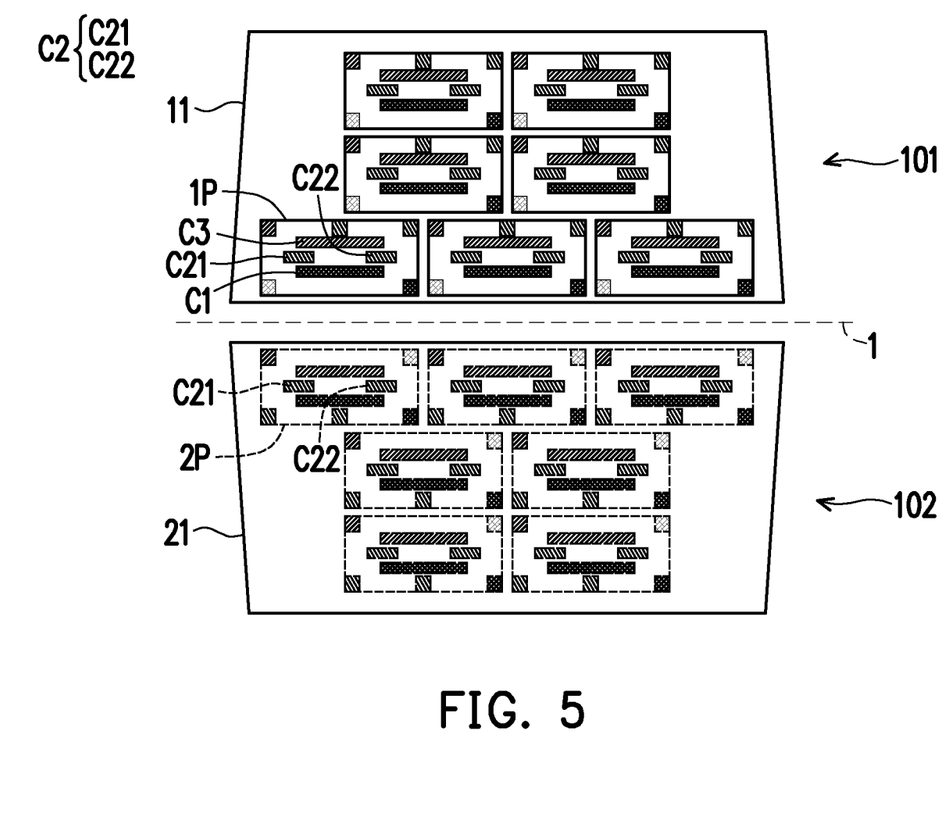

Referring to FIG. 5, FIG. 5 is a schematic view of a display unit according to an embodiment of the disclosure. Compared with the embodiment shown in FIG. 3, the second light-emitting element C2 in each of the pixels 1P and 2P includes a first sub-light-emitting unit C21 and a second sub-light-emitting unit C22 that are discrete. Nonetheless, the disclosure is not limited thereto. In some embodiments, the first light-emitting element C1 includes a plurality of discrete sub-light-emitting units. In some embodiments, the third light-emitting element C3 includes a plurality of discrete sub-light-emitting units.

Figure 6:
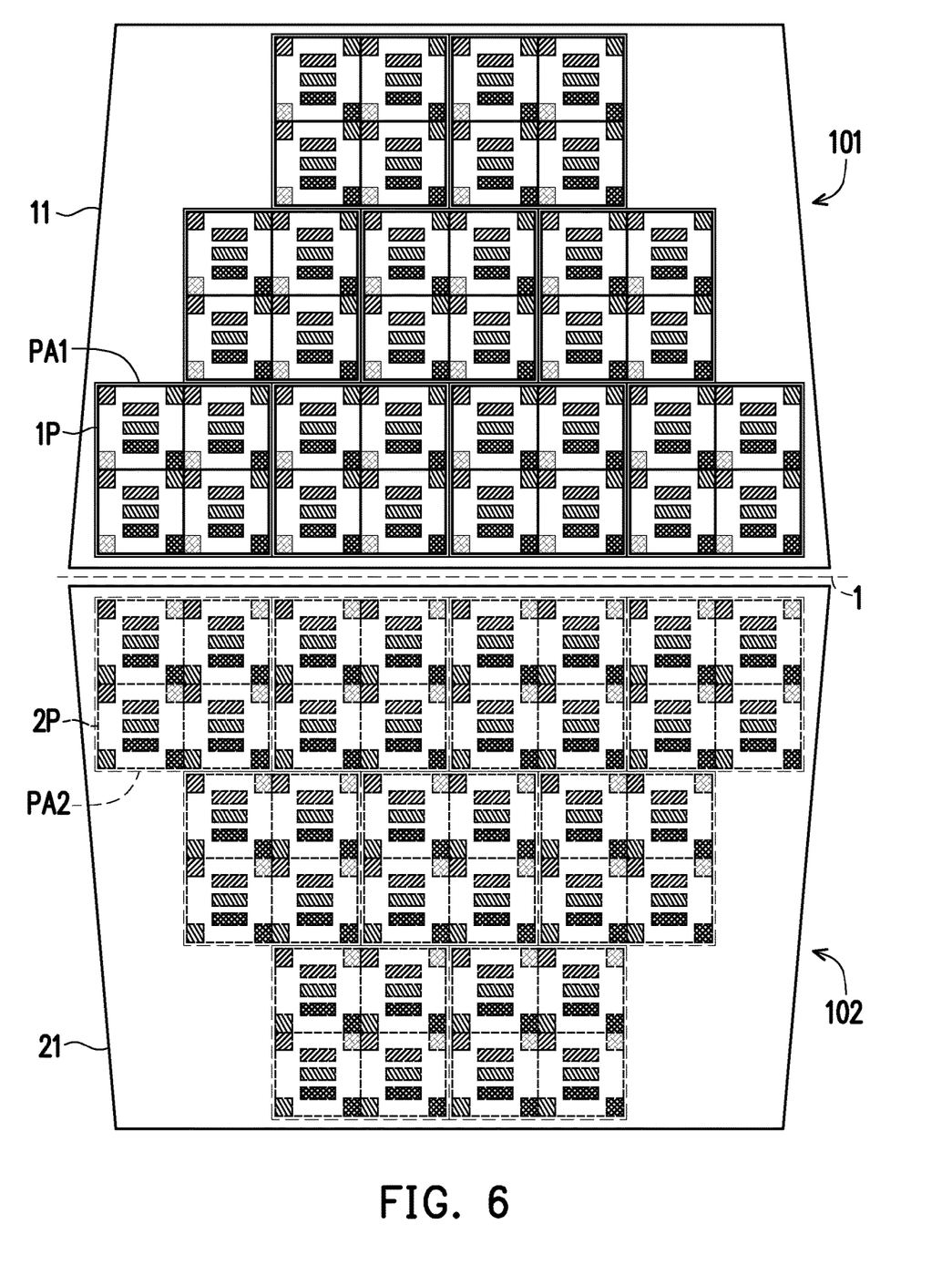

Referring to FIG. 6, FIG. 6 is a schematic view of a display unit according to an embodiment of the disclosure. Compared with the embodiment shown in FIG. 3, each four pixels 1P are packaged by a package structure PA1, and each four pixels 2P are packaged by a package structure PA2. Nonetheless, the disclosure is not limited thereto. In some embodiments, the package structure PA1 and the package structure PA2 respectively package N pixels 1P and N pixels 2P, where N is greater than or equal to 2.

In summary of the foregoing, in the arcuate display device provided by the embodiment of the disclosure, the driving devices corresponding to the display units having the same minimum distance from the virtual axis have the same circuit layout design, preventing influences of the difference in the parasitic resistance and parasitic capacitance caused by the difference in circuit layout in different driving devices on the optical performance. In addition, the light-emitting elements of different colors in the pixels disposed at different sides of the virtual axis may be arranged in the same direction, so that dark or bright lines do not appear at a place close to the virtual axis, and the corresponding light-emitting elements of the same color at two sides of the virtual axis are not be misaligned.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An arcuate display device, comprising:
   a plurality of display units arranged into an array form on an arcuate display surface of the arcuate display device, each of the display units having a plurality of pixels, each of the pixels comprising a substrate and a first light-emitting element disposed at a first position of the substrate, a second light-emitting element disposed at a second position of the substrate, and a third light-emitting element disposed at a third position of the substrate;
   a virtual axis located on the arcuate display surface, wherein the display units are respectively disposed at a first side and a second side of the virtual axis, and the number of pixels that the display unit has increases as a distance from the display unit to the virtual axis decreases; and
   a plurality of driving devices configured to respectively control the display units,
   wherein the driving devices corresponding to the display units having a same minimum distance from the virtual axis have a same circuit layout design,
   the first position, the second position, and the third position are sequentially arranged in a direction away from the virtual axis, and
   optical properties of the first light-emitting elements and the third light-emitting elements in at least a part of the pixels disposed at the first side of the virtual axis are respectively substantially the same as optical properties of the third light-emitting elements and the first light-emitting elements in at least a part of the pixels disposed at the second side of the virtual axis.

2. The arcuate display device according to claim 1, wherein optical properties of the first light-emitting element and the third light-emitting element in each of the pixels disposed at the first side of the virtual axis are respectively substantially the same as optical properties of the third light-emitting element and the first light-emitting element in each of the pixels disposed at the second side of the virtual axis.

3. The arcuate display device according to claim 1, wherein a first conductive pin, a second conductive pin, and a third conductive pin respectively corresponding to the first position, the second position, and the third position are disposed on the substrate of each of the pixels, and circuit configuration of the substrate of each of the pixels disposed at the first side is the same as circuit configuration of the substrate of each of the pixels disposed at the second side.

4. The arcuate display device according to claim 1, wherein optical properties of the first light-emitting elements to the third light-emitting elements of each adjacent two of the pixels at the first side of the virtual axis correspond to each other, and optical properties of the first light-emitting elements to the third light-emitting elements of each adjacent two of the pixels at the second side of the virtual axis correspond to each other.

5. The arcuate display device according to claim 1, wherein optical properties of the first light-emitting element of one pixel of each adjacent two of the pixels at the first side of the virtual axis correspond to optical properties of the third light-emitting element of the other pixel, and optical properties of the first light-emitting element of one pixel of each adjacent two of the pixels at the second side of the virtual axis correspond to optical properties of the third light-emitting element of the other pixel.

6. The arcuate display device according to claim 1, wherein at least one of the first light-emitting element, the second light-emitting element, and the third light-emitting element of each of the pixels comprises a first sub-light-emitting unit and a second sub-light-emitting unit, and the first sub-light-emitting unit and the second sub-light-emitting unit are discretely disposed.

7. The arcuate display device according to claim 1, wherein the display units disposed at the first side of the virtual axis are configured to receive a first scan signal, the display units disposed at the second side of the virtual axis are configured to receive a second scan signal, and a transmission direction of the first scan signal is opposite to a transmission direction of the second scan signal.

8. The arcuate display device according to claim 1, wherein the display units disposed at the first side of the virtual axis are configured to receive a first data signal, the display units disposed at the second side of the virtual axis are configured to receive a second data signal, and a transmission direction of the first data signal is opposite to a transmission direction of the second data signal.

9. The arcuate display device according to claim 8, wherein the first data signal or the second data signal corresponding to the display units farther from the virtual axis comprises more signals corresponding to zero grayscale.

10. The arcuate display device according to claim 1, further comprising a plurality of package structures configured to package the pixels, and each of the package structures packages N of the pixels, where N is greater than or equal to 2.

11. The arcuate display device according to claim 1, wherein optical properties of the second light-emitting element in each of the pixels disposed at the first side of the virtual axis are substantially the same as optical properties of the second light-emitting element in each of the pixels disposed at the second side of the virtual axis.

* * * * *